United States Patent
Guinan

(10) Patent No.: US 10,395,052 B2
(45) Date of Patent: Aug. 27, 2019

(54) MANAGING DATA HANDLING POLICIES

(71) Applicant: TrustArc Inc, San Francsico, CA (US)

(72) Inventor: Daniel J. Guinan, Omaha, NE (US)

(73) Assignee: TRUSTARC INC, San Francisco, CA (US)

( * ) Notice: Subject to any disclaimer, the term of this patent is extended or adjusted under 35 U.S.C. 154(b) by 0 days.

(21) Appl. No.: 15/828,831

(22) Filed: Dec. 1, 2017

(65) Prior Publication Data

US 2018/0101694 A1     Apr. 12, 2018

Related U.S. Application Data

(63) Continuation of application No. 13/841,777, filed on Mar. 15, 2013, now Pat. No. 9,864,873.

(51) Int. Cl.
| | |
|---|---|
| *G06F 21/62* | (2013.01) |
| *H04W 12/08* | (2009.01) |
| *H04L 29/08* | (2006.01) |
| *H04L 9/32* | (2006.01) |

(52) U.S. Cl.
CPC .......... *G06F 21/6218* (2013.01); *H04L 9/321* (2013.01); *H04L 9/3263* (2013.01); *H04L 67/141* (2013.01); *H04W 12/08* (2013.01)

(58) Field of Classification Search
CPC combination set(s) only.
See application file for complete search history.

(56) References Cited

U.S. PATENT DOCUMENTS

| | | |
|---|---|---|
| 6,092,200 A | 7/2000 | Muniyappa et al. |
| 6,192,131 B1 | 2/2001 | Geer et al. |
| 6,275,941 B1 | 8/2001 | Saito et al. |
| 6,292,896 B1 | 9/2001 | Guski et al. |
| 6,353,886 B1 | 3/2002 | Howard et al. |
| 6,430,690 B1 | 8/2002 | Vanstone et al. |
| 6,532,451 B1 | 3/2003 | Schell et al. |
| 6,775,772 B1 | 8/2004 | Binding et al. |
| 7,013,389 B1 | 3/2006 | Srivastava et al. |
| 7,065,579 B2 | 6/2006 | Traversat et al. |
| 7,231,517 B1 | 6/2007 | Mashayekhi |
| 7,254,608 B2 | 8/2007 | Yeager et al. |
| 7,299,288 B2 | 11/2007 | Chang et al. |
| 7,328,243 B2 | 2/2008 | Yeager et al. |
| 7,360,082 B1 | 4/2008 | Berthold et al. |
| 7,376,827 B1 | 5/2008 | Jiao |

(Continued)

OTHER PUBLICATIONS

Computer Desktop Encyclopedia definition of "processor", found on the world wide web at: http://lookup.computerlanguage.com/host_app/search?cid=C999999&term=processor&lookup.x=0&lookup.y=0.

(Continued)

*Primary Examiner* — Jason K Gee
*Assistant Examiner* — Abdullah Almamun
(74) *Attorney, Agent, or Firm* — Paul S. Drake

(57) ABSTRACT

A method, computer usable program product or system for automatically sharing a set of sensitive data in accordance with a set of predetermined policy requirements including receiving across a network a set of certified policy commitments for a node; authenticating the set of certified policy commitments; utilizing a processor to automatically determine whether the set of certified policy commitments satisfies the set of predetermined policy requirements; and upon a positive determination, transmitting across the network the set of sensitive data to the node.

20 Claims, 14 Drawing Sheets

(56) References Cited

U.S. PATENT DOCUMENTS

| | | |
|---|---|---|
| 7,581,095 B2 | 8/2009 | Billhartz |
| 7,624,441 B2 | 11/2009 | Barkan et al. |
| 7,783,884 B2 | 8/2010 | Nakano et al. |
| 7,796,751 B2 | 9/2010 | Gentry |
| 7,813,299 B2 | 10/2010 | Yumoto et al. |
| 7,853,785 B1 | 12/2010 | Thurman et al. |
| 7,996,673 B2 | 8/2011 | Ivanov et al. |
| 8,015,597 B2 | 9/2011 | Libin et al. |
| 8,024,781 B2 | 9/2011 | Saunders et al. |
| 8,190,675 B2 | 5/2012 | Tribbett |
| 8,208,900 B2 | 6/2012 | Adler et al. |
| 8,281,389 B2 | 10/2012 | Beaver et al. |
| 8,341,715 B2 | 12/2012 | Sherkin et al. |
| 8,543,816 B2 | 9/2013 | Mercer |
| 8,621,591 B2 | 12/2013 | Sobel et al. |
| 8,683,052 B1 | 3/2014 | Brinskelle |
| 8,688,583 B2 | 4/2014 | Boccon-Gibod et al. |
| 8,700,898 B1 | 4/2014 | Korthny et al. |
| 8,745,372 B2 | 6/2014 | Orsini |
| 8,843,997 B1 | 9/2014 | Hare |
| 8,869,235 B2 | 10/2014 | Qureshi et al. |
| 8,914,905 B2 | 12/2014 | Okuyama et al. |
| 9,332,002 B1 | 5/2016 | Bowen |
| 2002/0029337 A1 | 3/2002 | Sudia et al. |
| 2002/0073311 A1 | 6/2002 | Futamura et al. |
| 2002/0161996 A1 | 10/2002 | Koved et al. |
| 2002/0178240 A1 | 11/2002 | Fiveash et al. |
| 2003/0149781 A1 | 8/2003 | Yared et al. |
| 2003/0182475 A1 | 9/2003 | Gimenez |
| 2004/0015689 A1 | 1/2004 | Billhartz |
| 2004/0054919 A1 | 3/2004 | Duri et al. |
| 2005/0005097 A1 | 1/2005 | Murakawa |
| 2005/0097327 A1 | 5/2005 | Ondet et al. |
| 2005/0144463 A1 | 6/2005 | Rossebo et al. |
| 2007/0005976 A1 | 1/2007 | Riittinen |
| 2008/0016335 A1 | 1/2008 | Takahashi et al. |
| 2008/0201575 A1 | 8/2008 | van der Rijn |
| 2009/0099860 A1 | 4/2009 | Karabulut et al. |
| 2011/0239270 A1 | 9/2011 | Sovio et al. |
| 2012/0117608 A1 | 5/2012 | Metke et al. |
| 2012/0185696 A1 | 7/2012 | Lortz et al. |
| 2012/0221955 A1 | 8/2012 | Raleigh et al. |
| 2013/0086652 A1 | 4/2013 | Kavantzas et al. |
| 2013/0227281 A1 | 8/2013 | Kounga et al. |
| 2013/0305314 A1 | 11/2013 | Niimura |
| 2014/0013110 A1 | 1/2014 | Thoniel et al. |
| 2014/0122873 A1 | 5/2014 | Deutsch et al. |

OTHER PUBLICATIONS

Garcia, Diego Zuquim Guimaraes; de Toledo, Maria Beatriz Felgar; "A Web Service Architecture Providing QoS Management", LA-Web '06, Pub. Date: 2006, pp. 189-198, http://ieeexplore.ieee.org/stamp/stamp.jsp?tp=&arnumber=4022109.

Hamada, Takeo, "Dynamic Role Creation from Roll Class Hierarchy—Security Management of Service Session in Dynamic Service Environment", TINA 97, Pub. Date: 1997, pp. 152-163, http://ieeexplore.ieee.org/stamp/stamp.jsp?tp=&arnumber=660720.

"X.509", Wikipedia.com, Jan. 9, 2012, found on the world wide web at: http://web.archive.org/web/20120109190205/http://en.wikipedia.org/wiki/X.509.

"XML", Wikipedia.com, Mar. 5, 2012, found on the world wide web at: http://web.archive.org/web/20120305170157/https://en.wikipedia.org/wiki/Xml.

"Cython", Wikipedia.com, Dec. 10, 2011, found on the world wide web at: http://web.archive.org/web/20111210144342/http://en.wikipedia.org/wiki/Cython.

Pfeiffer, Stefan; Unger, Sebastian; Timmermann, Dirk; Lehmann, Andreas. "Secure Information Flow Awareness for Smart Wireless eHealth Systems". 2012 9th International Multi-Conference on Systems, Signals and Devices (SSD) (Mar. 2012). http://ieeexplore.ieee.org/stamp/stamp.jsp?arnumber=6198123.

Steele, Robert; Min, Kyongho. "Role-Based Access to Portable Health Records". 2009 International Conference on Management and Service Science (Sep. 2009). MASS '09. http://ieeexplore.ieee.org/stamp/stamp.jsp?arnumber=5301451.

She, Wei; Yen, I-Ling; Thuraisingham, Bhavani. "Enhancing Security Modeling for Web Services using Delegation and Pass-On". IEEE International Conference on Web Services, 2008. ICWS '08 (Sep. 2008). http://ieeexploreieee.org/stamp/stamp.jsp?tp=&arnumber=4670219

Negm, Khaled E.A.; Adi, Wael; Mabrouk, Ali; Ghraieb, Heykel. Secured Wireless Ad-Hoc Network Administration Scheme. Proceeedings of the 2003 10th International Conference on Electronics, Circuits and Systems. Pub. Date: 2003. http://ieeexplore.ieee.org/stamp/stamp.jsp?arnumber=1301686.

Prasad, Neeli Rashmi. State of the Art of the Wireless Security in OFDM(A)-based Systems. IEEE Mobile WiMAX Symposium, 2009. Pub. Date: 2009. http://ieeexplore.ieee.org/stamp/stampjsp?arnumber=5277873.

Bonatti, P.A.; Mogavera, F. Comparing Rule-Based Policies. 2008 IEEE Workshop on Policies for Distributed Systems and Networks. https://ieeexplore.ieee.org/stamp/stamp.jsp?tp=&arnumber=4556573 (Year 2008).

De Coi, Jun L., et al. A Trust Management Package for Policy-Driven Protection & Personalization of Web Content. 20018 IEEE Workshop on Policies for Distributed Systems and Networks. https://ieeexplore.ieee.org/stamp/stamp.jsp?tp=&arnumber=4556606 (Year 2008).

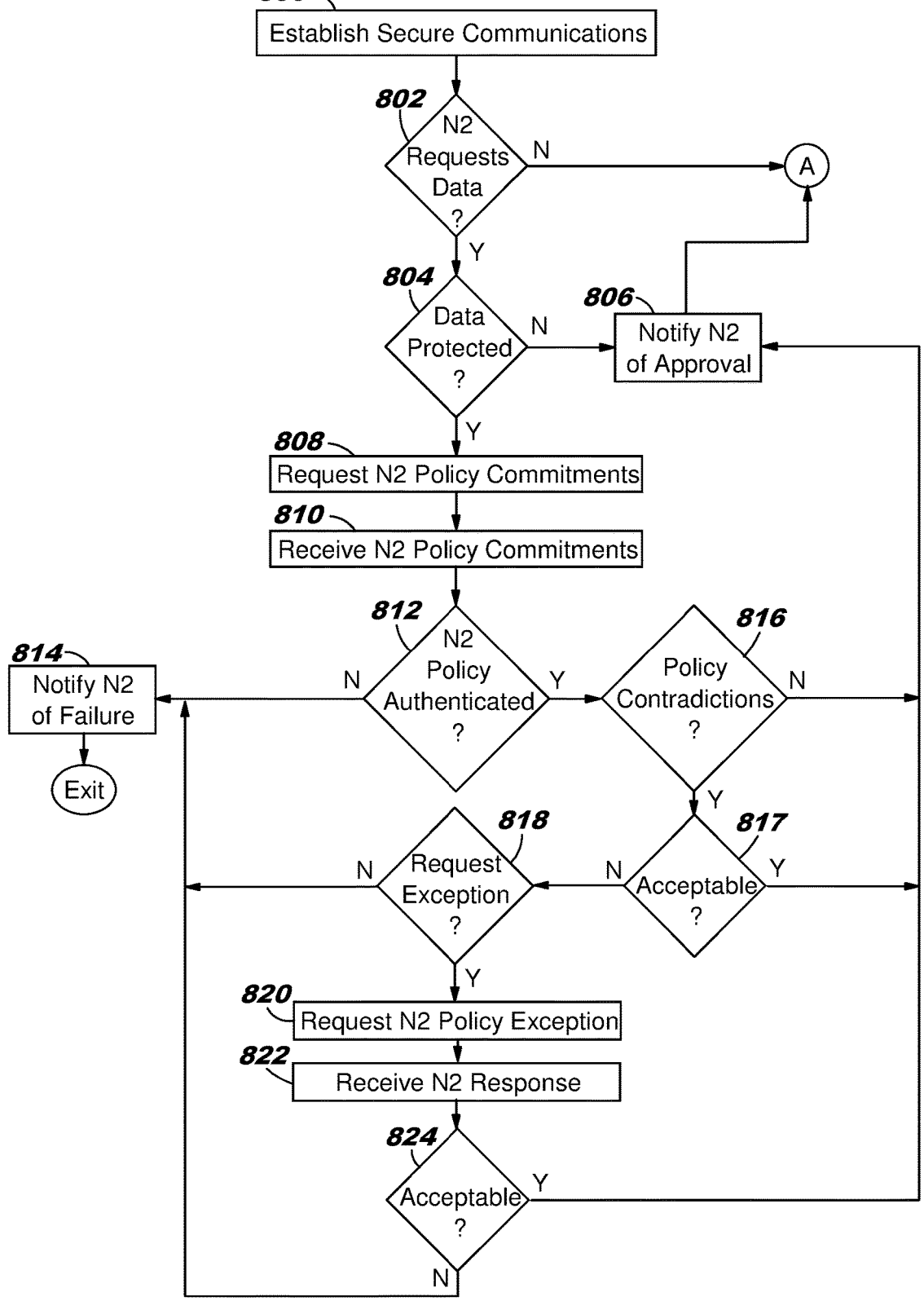

US 10,395,052 B2

MANAGING DATA HANDLING POLICIES

This application is a continuation of application Ser. No. 13/841,777 filed Mar. 15, 2013 entitled "MANAGING DATA HANDLING POLICIES", the disclosure of which is incorporated in its entirety herein by reference.

BACKGROUND

This application is copending with concurrently filed application Ser. No. 13/842,580 of Daniel Guinan, filed on Mar. 15, 2013, entitled "MANAGING DATA HANDLING POLICIES"; and with concurrently filed application Ser. No. 13/842,756 of Daniel Guinan, filed on Mar. 15, 2013, entitled "MANAGING DATA HANDLING POLICIES"; the disclosure of each of the foregoing which is incorporated in its entirety herein by reference.

1. Technical Field

The present invention relates generally to managing the handling of data, and in particular, to a computer implemented method for managing data handling policies between multiple nodes.

2. Description of Related Art

The secure exchange of information in the age of the internet is an ongoing issue. Internet security can include browser security and network security as that applies to operating systems and applications. Many technologies have been utilized including passwords, biometrics, encryption, and authentication such as with the use of public and private keys. Various communication protocols have been utilized including transmission control protocol and internet protocol (TCP/IP) and a secure socket layer (SSL). Various languages have also been utilized that can take advantage of the foregoing including hypertext markup language (HTML), extensible markup language (XML) and more recently LXML which binds certain XML with certain libraries through an application program interface.

SUMMARY

The illustrative embodiments provide a method, computer usable program product or system for automatically sharing a set of sensitive data in accordance with a set of predetermined policy requirements including receiving across a network a set of certified policy commitments for a node; authenticating the set of certified policy commitments; utilizing a processor to automatically determine whether the set of certified policy commitments satisfies the set of predetermined policy requirements; and upon a positive determination, transmitting across the network the set of sensitive data to the node.

BRIEF DESCRIPTION OF THE SEVERAL VIEWS OF THE DRAWINGS

The novel features believed characteristic of the invention are set forth in the appended claims. The invention itself, further objectives and advantages thereof, as well as a preferred mode of use, will best be understood by reference to the following detailed description of illustrative embodiments when read in conjunction with the accompanying drawings, wherein:

FIGS. 8A and 8B are a flow diagram of the operation of a node exchanging data handling policies and data with another node in accordance with a second embodiment;

DETAILED DESCRIPTION

Processes and devices may be implemented and utilized to negotiate and establish communications between multiple nodes based upon compatibility of their data handling policies, thereby creating automated policy-based decisioning systems that establish communications. These automated decisioning systems establish communications between nodes when policies are compatible and therefore establish a trusted communication between nodes. Data shared after a trusted communication channel is established is assured to conform to policy and therefore the sharing of sensitive data can take place with the same assurance as is embodied in the policies themselves. In these decisioning systems, trust decisions are based on digitally signed policy commitments, similar to digital certificates, that are non-forgeable and non-repudiable and which contain policy commitments that can be automatically compared to policy requirements. These processes and apparatuses may be implemented and utilized as will be explained with reference to the various embodiments below.

Figure 1:
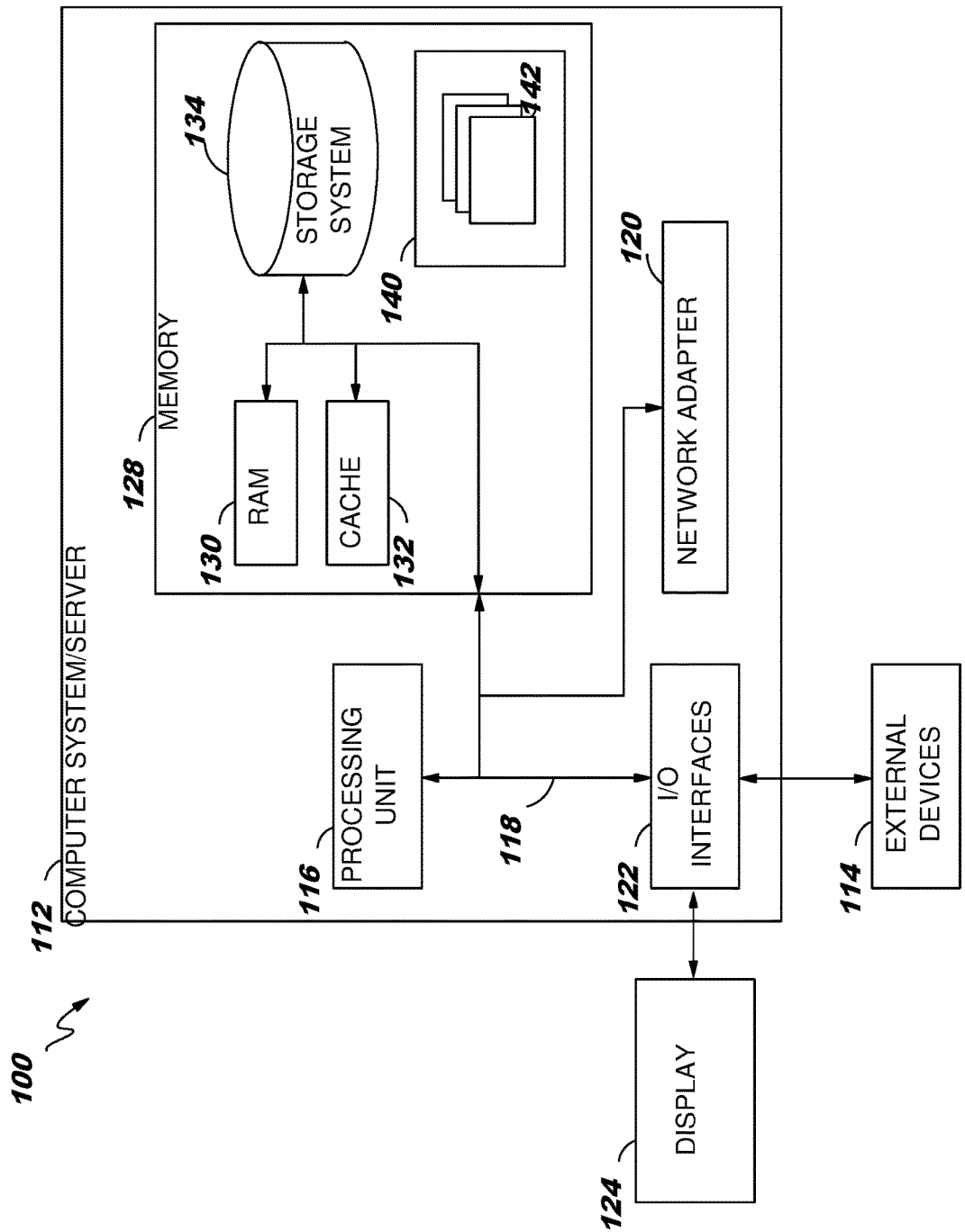
FIG. 1 is a block diagram of a data processing system in which various embodiments may be implemented.

FIG. 1 is a block diagram of a data processing system in which various embodiments may be implemented. Data processing system 100 is one example of a suitable data processing system and is not intended to suggest any limitation as to the scope of use or functionality of embodiments of the invention described herein. Regardless, data processing system 100 is capable of being implemented and/or performing any of the functionality set forth herein.

In data processing system 100 there is a computer system/server 112, which is operational with numerous other general purpose or special purpose computing system environments, peripherals, or configurations. Examples of well-known computing systems, environments, and/or configurations that may be suitable for use with computer system/server 112 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 112 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 112 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 112 in data processing system 100 is shown in the form of a general-purpose computing device. The components of computer system/server 112 may include, but are not limited to, one or more processors or processing units 116, a system memory 128, and a bus 118 that couples various system components including system memory 128 to processor 116.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 112 typically includes a variety of computer system readable media. Such media may be any available media that is accessible by computer system/server 112, and it includes both volatile and non-volatile media, removable and non-removable media.

System memory 128 can include computer system readable media in the form of volatile memory, such as random access memory (RAM) 130 and/or cache memory 132. Computer system/server 112 may further include other removable/non-removable, volatile/non-volatile computer system storage media. By way of example, storage system 134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 118 by one or more data media interfaces. Memory 128 may include at least one program product having a set (e.g., at least one) of program modules that are configured to carry out the functions of embodiments of the invention. Memory 128 may also include data that will be processed by a program product.

Program/utility 140, having a set (at least one) of program modules 142, may be stored in memory 128 by way of example, and not limitation, as well as an operating system, one or more application programs, other program modules, and program data. Each of the operating system, one or more application programs, other program modules, and program data or some combination thereof, may include an implementation of a networking environment. Program modules 142 generally carry out the functions and/or methodologies of embodiments of the invention. For example, a program module may be software for managing data handling policies between multiple data processing systems.

Computer system/server 112 may also communicate with one or more external devices 114 such as a keyboard, a pointing device, a display 124, etc.; one or more devices that enable a user to interact with computer system/server 112; and/or any devices (e.g., network card, modem, etc.) that enable computer system/server 112 to communicate with one or more other computing devices. Such communication can occur via I/O interfaces 122 through wired connections or wireless connections. Still yet, computer system/server 112 can communicate with one or more networks such as a local area network (LAN), a general wide area network (WAN), and/or a public network (e.g., the Internet) via network adapter 120. As depicted, network adapter 120 communicates with the other components of computer system/server 112 via bus 118. It should be understood that although not shown, other hardware and/or software components could be used in conjunction with computer system/server 112. Examples, include, but are not limited to: microcode, device drivers, tape drives, RAID systems, redundant processing units, data archival storage systems, external disk drive arrays, etc.

Figure 2:
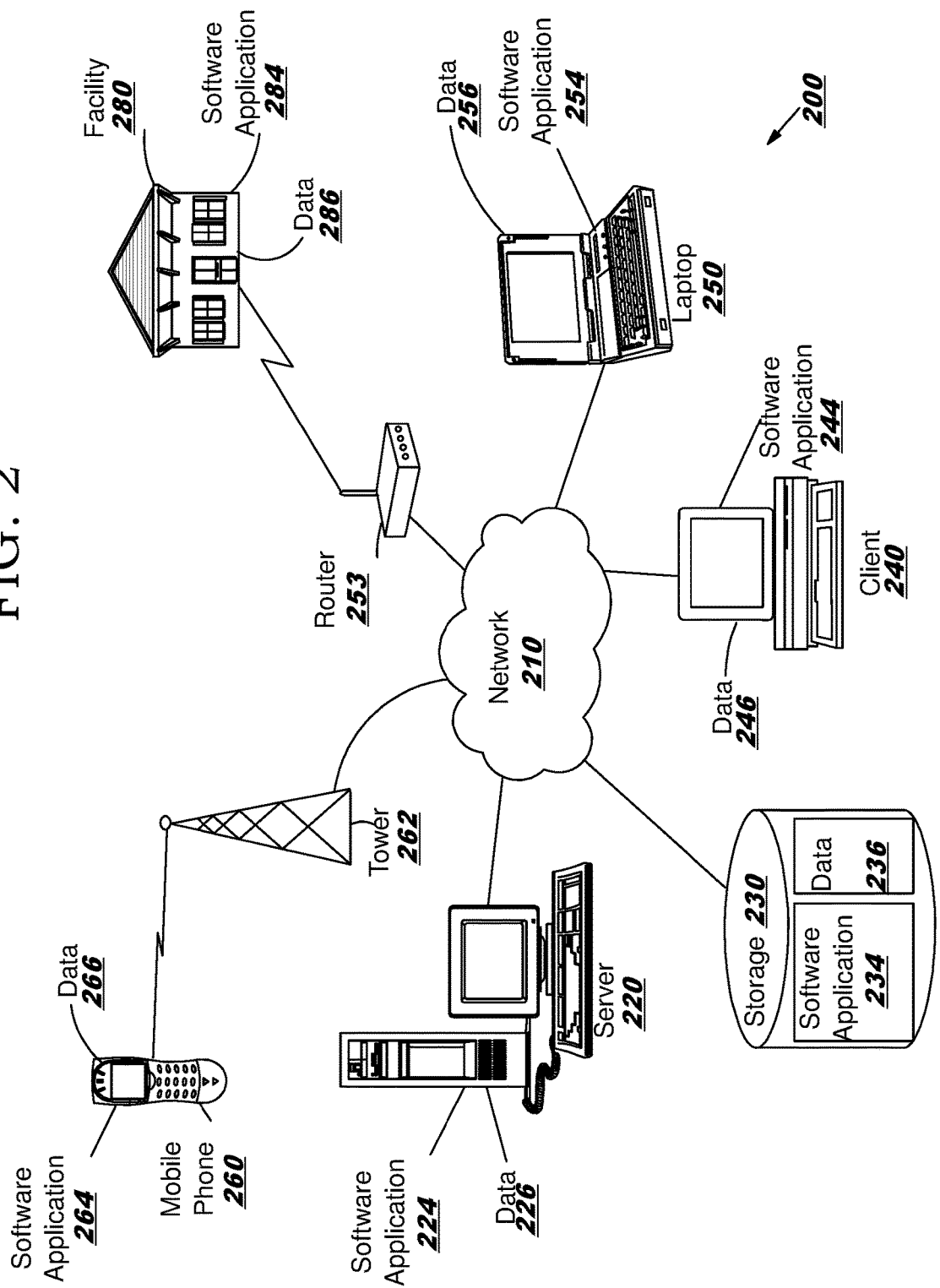
FIG. 2 is a block diagram of a network of data processing systems in which various embodiments may be implemented.

FIG. 2 is a block diagram of a network of data processing systems in which various embodiments may be implemented. Data processing environment 200 is a network of data processing systems such as described above with reference to FIG. 1. Software applications may execute on any computer or other type of data processing system in data processing environment 200. Data processing environment 200 includes network 210. Network 210 is the medium used to provide simplex, half duplex and/or full duplex communications links between various devices and computers connected together within data processing environment 200. Network 210 may include connections such as wire, wireless communication links, or fiber optic cables.

Server 220 and client 240 are coupled to network 210 along with storage unit 230. In addition, laptop 250 and facility 280 (such as a home or business) are coupled to network 210 including wirelessly such as through a network router 253. A mobile phone 260 may be coupled to network 210 through a mobile phone tower 262. Data processing systems, such as server 220, client 240, laptop 250, mobile phone 260 and facility 280 contain data and have software applications including software tools executing thereon. Other types of data processing systems such as personal digital assistants (PDAs), smartphones, tablets and netbooks may be coupled to network 210.

Server 220 may include software application 224 and data 226 for managing data handling policies between multiple data processing systems or other software applications and data in accordance with embodiments described herein. Storage 230 may contain software application 234 and a content source such as data 236 which may be personal or other private or confidential data, or policies for the handling of such data. Other software and content may be stored on storage 230 for sharing among various computer or other data processing devices. Client 240 may include software application 244 and data 246. Laptop 250 and mobile phone 260 may also include software applications 254 and 264 and data 256 and 266. Facility 280 may include software applications 284 and data 286. Other types of data processing systems coupled to network 210 may also include software applications. Software applications could include a web browser, email, or other software application that can manage data handling policies between multiple data processing systems.

Server 220, storage unit 230, client 240, laptop 250, mobile phone 260, and facility 280 and other data processing devices may couple to network 210 using wired connections, wireless communication protocols, or other suitable data connectivity. Client 240 may be, for example, a personal computer or a network computer.

In the depicted example, server 220 may provide data, such as boot files, operating system images, and applications to client 240 and laptop 250. Server 220 may be a single computer system or a set of multiple computer systems working together to provide services in a client server environment. Client 240 and laptop 250 may be clients to server 220 in this example. Client 240, laptop 250, mobile phone 260 and facility 280 or some combination thereof, may include their own data, boot files, operating system images, and applications. Data processing environment 200 may include additional servers, clients, and other devices that are not shown.

In the depicted example, data processing environment 200 may be the Internet. Network 210 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 200 also may be implemented as a number of different types of networks, such as for example, an intranet, a local area network (LAN), or a wide area network (WAN). FIG. 2 is intended as an example, and not as an architectural limitation for the different illustrative embodiments.

Among other uses, data processing environment 200 may be used for implementing a client server environment in which the embodiments may be implemented. A client server environment enables software applications and data to be distributed across a network such that an application functions by using the interactivity between a client data processing system and a server data processing system. Data processing environment 200 may also employ a service oriented architecture where interoperable software components distributed across a network may be packaged together as coherent business applications.

Figure 3:
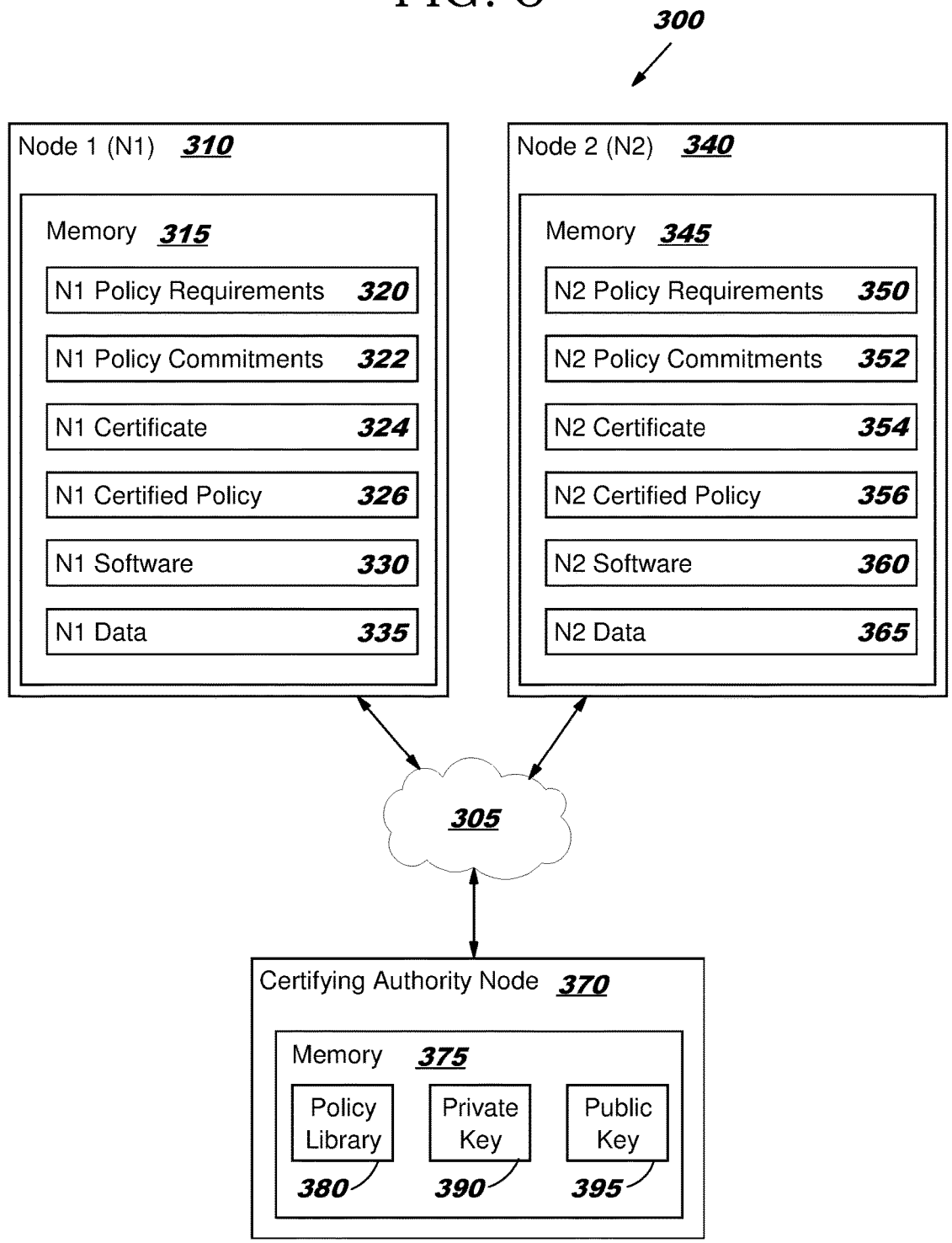
FIG. 3 is a block diagram of nodes managing data handling policies in which various embodiments may be implemented.

FIG. 3 is a block diagram of nodes managing data handling policies in which various embodiments may be implemented. In this example, two nodes are shown with data to exchange under certain conditions, referred to herein as policies, with the assistance of a certifying authority node. A node may be a data processing system, a group of data processing systems working together, or a portion of a data processing system such as a virtual machine. Each node includes data which may be handled in accordance with certain policies.

A set of nodes 300 includes a node 1 (N1) 310, a node 2 (N2) 340 and a certifying authority node 370. These nodes are in communication 305 with each other such as across a network or the internet. Node 1 includes a memory 315 with a set of policy requirements 320, a set of policy commitments 322, a certificate 324, a certified policy 326, software 330 and data 335. Node 2 includes a memory 345 with a set of policy requirements 350, a set of policy commitments 352, a certificate 354, a certified policy 356, software 360 and data 365. Certifying authority node 370 includes a memory 375 with a policy library 380, a private key 390 and a public key 395.

N1 policy requirements 320 are the policies that node 1 requires by any other node that receives N1 data 335. These policies may be derived from policy library 380. N1 policy commitments 322 are the policies that node 1 commits to any other node that provides data to node 1. These policies may also be derived from policy library 380. N1 certified policy 326 includes policy commitments 322 and may include policy requirements 320. N1 certified policy 326 was generated by node 1 communicating with the certifying authority node and was electronically signed by the certifying authority node such as with private key 390. N1 certificate 324 is a certificate signed by a certifying authority such as certifying authority node 370 for establishing the identity of node 1 in communications with other nodes. N1 software 330 is utilized by node 1 to manage the policy requirements, policy commitments, and any subsequent exchange of data such as N1 data 335. N1 data 335 is data generated or gathered by node 1 and which is protected by node 1 with policy requirements 320.

Node 2 is similarly configured in this embodiment with policies, certificates, software and data. In alternative embodiments, either node 1 or node 2 may be a user or other entity without policy commitments or a certified policy, but with policy requirements, software and data to be protected.

Policy library 380 is a database of policies which may be adopted by a node as policy requirements or policy commitments. An example of a policy library is described below with reference to FIG. 5B. Private key 390 and public key 395 are a pair of cryptographic keys used to encrypt messages or certificates in an asymmetric key algorithm. The private key is maintained as a secret key by the certifying authority node and is used to sign certificates or certified policies. The public key is provided to other nodes to decrypt certificates or certified policies to verify that they have not been modified since signed by the certifying authority node. An example of a certified policy is described below with reference to FIG. 5A.

Figure 4A:
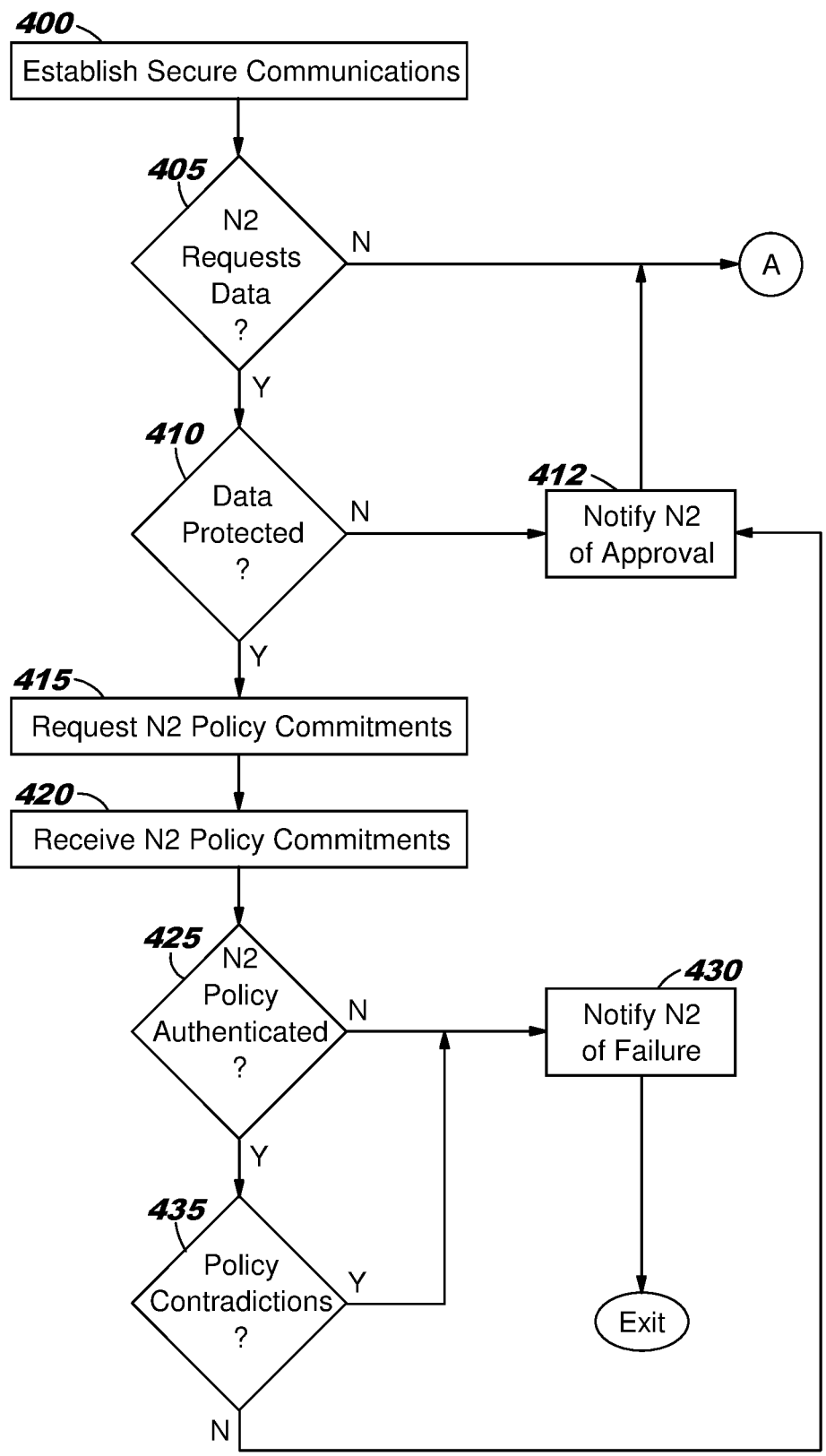
FIGS. 4A and 4B are a flow diagram of the operation of a node exchanging data handling policies and data with another node in accordance with a first embodiment.
Figure 4B:
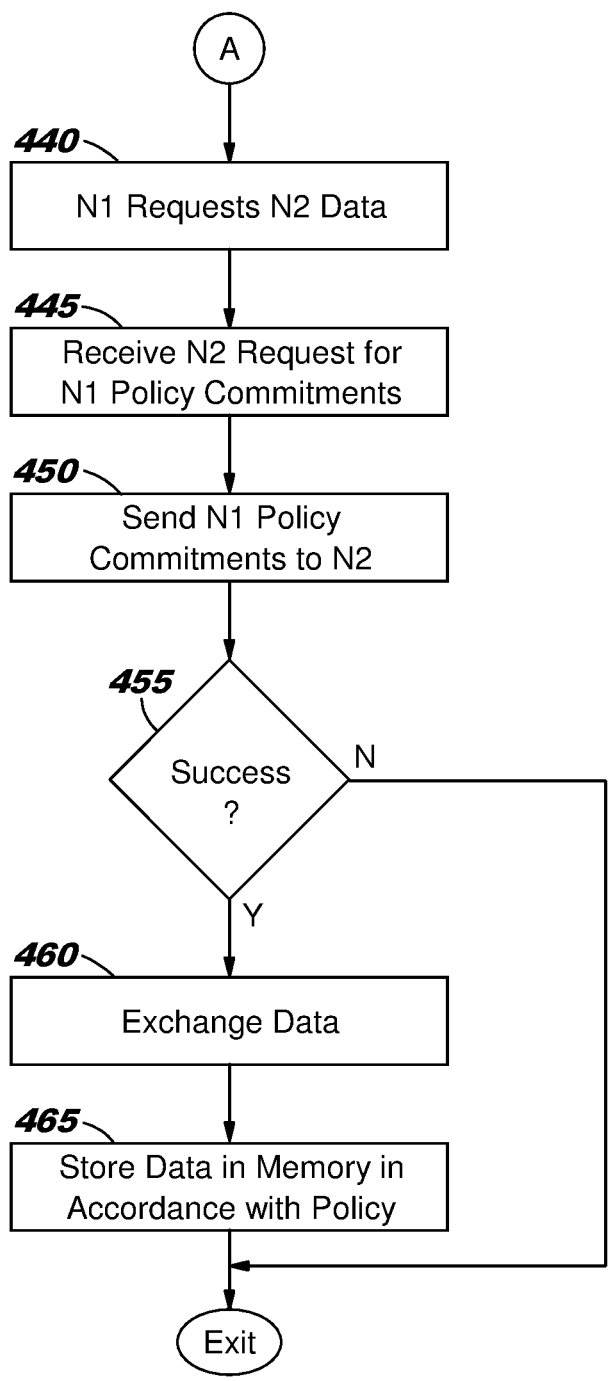

FIGS. 4A and 4B are a flow diagram of the operation of a node exchanging data handling policies and data with another node in accordance with a first embodiment. In this case, the flow diagram is shown from the perspective of node 1 (N1), but could similarly be shown from the perspective of node 2 (N2).

In a first step 400, node 1 establishes secure communications with node 2. In the case of an internet connection, this could involve the exchanging of certificates to establish the identity of the other node. This process should also yield the name of node 2 which will be utilized below. Those skilled in the art may utilize a variety of known techniques for establishing secure communications. In a second step 405, N1 determines whether it has received a request for N1 data from N2. If not, then processing continues to step 440 below. Otherwise, processing continues to step 410. In step 410, N1 determines whether the data requested needs protection or other data handling procedures. For example, the N1 data may contain sensitive information such as the social security number or employment identification number of N1, or information that may have been obtained by N1 from third parties. Alternatively, the N1 data requested may be non-sensitive information. Information about the sensitivity of data may be stored with that data in memory. If the requested data is not sensitive, then in step 412 N1 notifies N2 that the request for N1 data is approved and then processing continues to step 440 of FIG. 4B. Otherwise, processing continues to step 415.

In step 415, N1 requests a copy of the N2 policy commitments to determine whether N1 may share data with N2. These policy commitments may be incorporated into an N2 certified policy that has been signed by a certifying authority. In step 420, the policy commitments are received from N2. In an alternative embodiment, N2 may provide the N2 policy commitments when requesting the N1 data.

Subsequently in step 425, N1 authenticates (i.e. verifies) the N2 certified policy. As described below with reference to FIGS. 6A and 6B, a hash of the N2 certified policy has been encrypted with the private key of the certifying authority node thereby generating a certifying authority signature. N1 can then authenticate the certified policy by verifying that the certified policy is genuine and has not been modified. This authentication can be accomplished by hashing the certified policy, decrypting the signature using the certifying authority node public key, and comparing the results. In addition, N1 can compare the name of the node in the certified policy to the name acquired above when establishing the secure communications, thereby verifying node 2 is providing the correct certified policy and not the policy of a third party. If the certified policy is authenticated, then processing continues to step 435, otherwise processing continues to step 430. In step 430, N1 notifies N2 of the failure and processing ceases. That is, if the certified policy cannot be verified as unmodified, then there is no reason to provide or exchange data with N2. This notification can include the reason for the failure.

In step 435, the N2 policy commitments are compared to the N1 policy requirements. This is to determine whether the N2 policy commitments meet or exceed the N1 policy requirements. If there are contradictions where the N2 policy commitments do not meet or exceed the N1 policy requirements, then N1 may not share data with N2 as the appropriate data handling protections are not in place at N2. This comparison may be accomplished mathematically. That is, the policy requirements and policy commitments may each include a set of references to the policy library. Each of the references in the N1 policy requirements must correspond to a reference in the N2 policy commitments. As a result, in step 435, it is determined whether the policies contradict each other. If yes, then processing continues to step 430 above. If not, then processing continues to step 412 where N1 notifies N2 that the request for N1 data is approved and then processing continues to step 440 of FIG. 4B.

Figure 7:
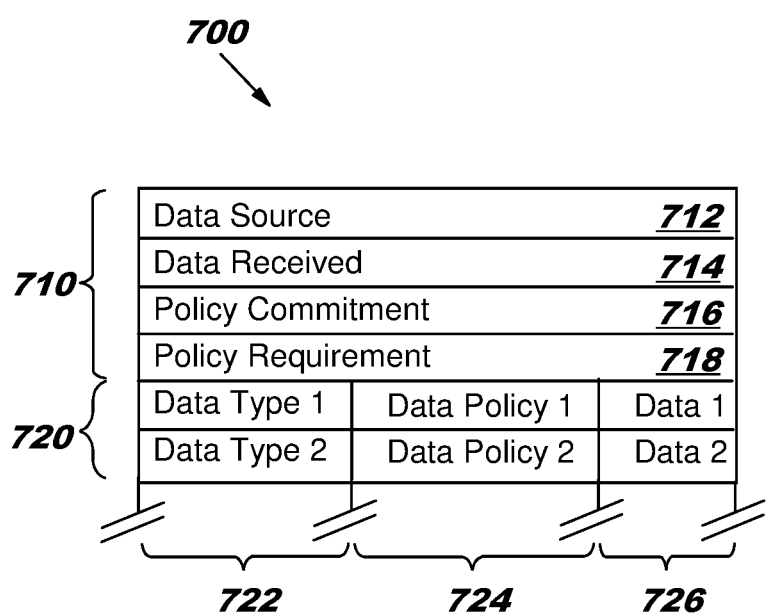
FIG. 7 is a block diagram of third party data stored in a node in which various embodiments may be implemented.

In step 440 of FIG. 4B, N1 requests data from N2. As a result, in steps 445 through 460 N2 may initiate processes similar to steps 405 through 435 as a precursor for sharing N2 data with N1. In step 445 N1 will receive a request from N2 for the N1 policy commitment. This policy commitment may be a certified policy of N1. In response, N1 provides the policy commitment to N2 in step 450. N2 can then authenticate the N1 policy commitment and review that policy against the N2 policy requirements. In response, N2 will send a message to N1 whether the authentication and review was successful. N1 receives that message in step 455. If failure, then processing ceases. If success, then in step 460 N1 and N2 exchange data based on their requests. Subsequently, in step 465, N1 stores in memory the data received from N2 (and N2 stores in its memory the data received from N1). FIG. 7 below illustrates an example of storing such third party data in node memory.

Figure 5A:
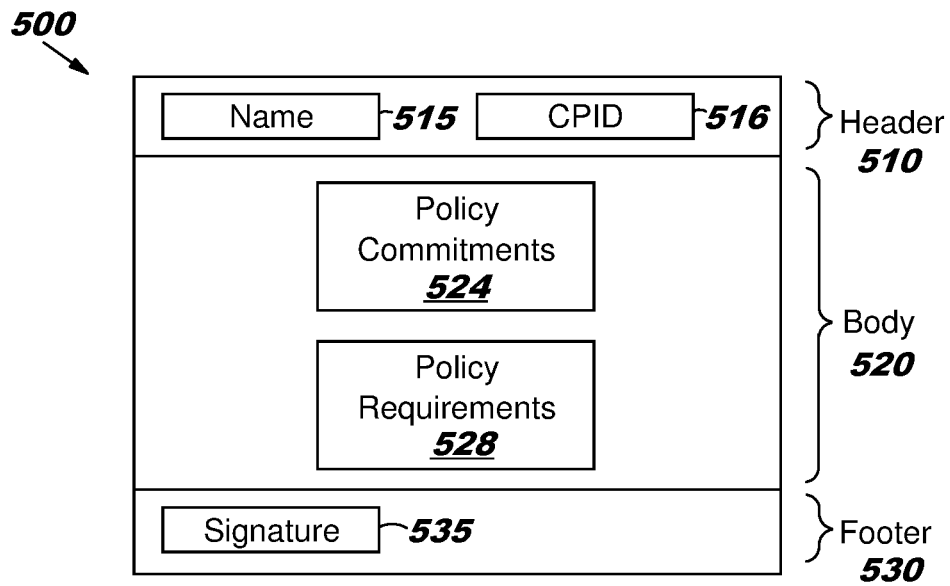
FIGS. 5A and 5B are block diagrams of a certified policy and a policy library in accordance with the first embodiment.

FIG. 5A is a block diagram of a certified policy in accordance with the first embodiment. A certified policy 500 is composed of three sections, a header 510, a body 520 and footer 530. The header can include a variety of information including an official name 515 of the node (entity or person) owning the certified policy and a certified policy identifier (CPID) 516. The official name 515 is useful in authenticating the entity of the certified policy with the entity identified during the exchange of certificates in establishing secure communications as described below with reference to FIG. 6B. The certificate policy identifier 516 may be useful for storage with any data received or provided pursuant to the certified policy. The CPID may also be useful in quickly obtaining another copy of the certified policy if needed in the future.

The body can include a set of policy commitments 524. These are data handling policies that the node commits to apply to third party information obtained by the owner. These policy commitments may be identified through a process described below with reference to FIG. 6B. In addition, the policy requirements 528 of the node may also be included in the certified policy. The footer can also include a variety of information such as a digital signature 535. The digital signature may be generated by a certifying authority by hashing header 510 and body 520 and then encrypting that hash using the certifying authority private key. The certified policy can then be authenticated by similarly hashing the header and body of the certified policy, decrypting digital signature 535 using the certifying body public token, and comparing the results. If the certified policy header and footer have not been modified, then the hash results should match the decrypted digital signature, thereby authenticating the certified policy. In addition, name 515 should match the name of the node providing the certified policy.

Figure 5B:
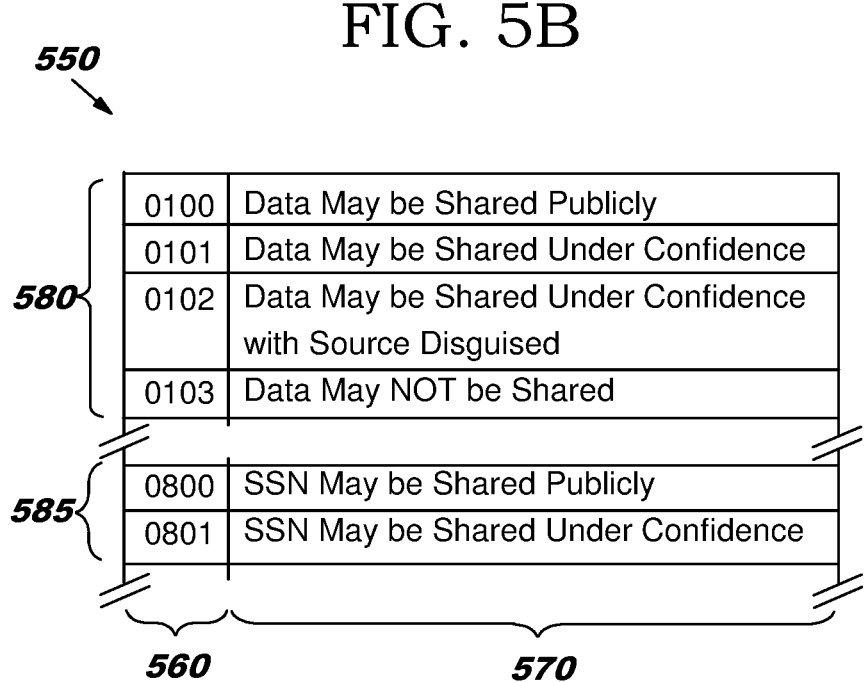

FIG. 5B is a block diagram of a policy library which may be utilized to generate policies in accordance with the first embodiment. Policy library 550 includes multiple entries, each entry including a reference number 560 and a description 570. The entries are generally presented in groups 580 and 585 (also referred to herein as sets of entries or policies) and within a hierarchical order within each group. That is, the entry with the lowest reference number within a group is the least restrictive and the entry with the highest number is the most restrictive. The group of entries starting with the number 01 includes general policies to be applied across all data types. The group of entries starting with the number 08 includes specific policies to be applied only to social security numbers in this example. For example, entry 0101 is less restrictive or protective of data than entry 0102 or 0103. Many other groups of entries may be generated that apply to other data types, sources of data, etc. by utilizing other starting reference numbers. This approach works well where each group of entries can be ordered sequentially by restrictiveness. For more complex hierarchical arrangements, a separate tree structure may be utilized to accompany the policy library. The tree structure could include a hierarchical ranking of the entries relative to each other in a non-linear fashion. That tree structure could be utilized as a look up table to determine the relative ranking of each policy in terms of restrictiveness. Alternative embodiments may utilize alternative policy structures such as tokens that are machine readable or encoded so that a processor can automatically compare various policies.

Figure 6A:
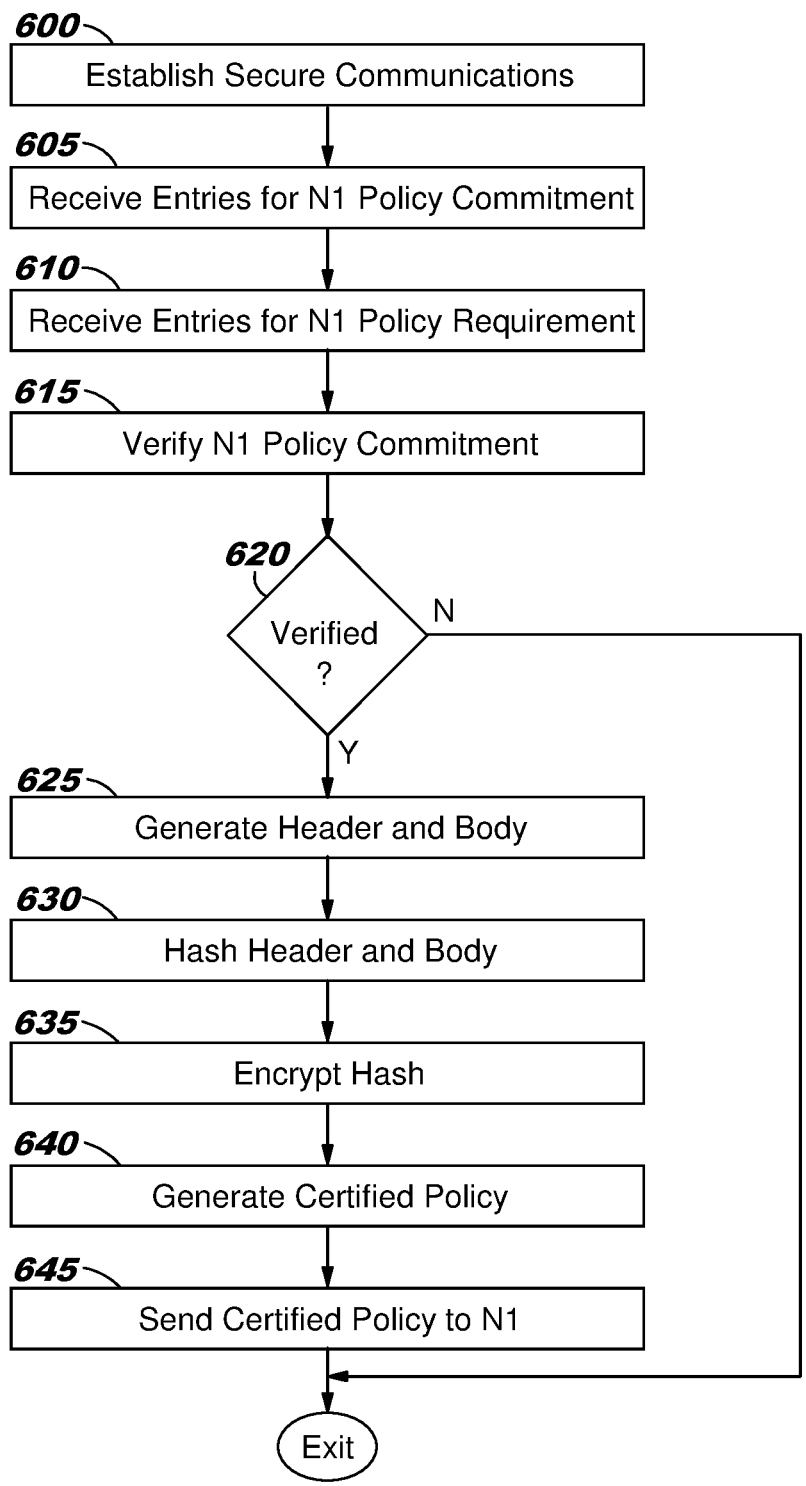
FIGS. 6A and 6B are flow diagrams of a creation and an authentication of a certified policy in accordance with the first embodiment.

FIG. 6A is a flow diagram of a creation of a certified policy in accordance with the first embodiment. This flow diagram is from the perspective of the certifying authority that is contacted by Node 1 (N1) to generate a certified policy but could similarly be shown from the perspective of node 2 (N2). In a first step 600, secure communications are established between the certifying authority node and N1. This includes obtaining the official name of Node 1 through the exchange of certificates in establishing secure communications. In a second step 605, the certifying authority receives the entries (i.e. policies) for the N1 policy commitment. This can be accomplished through a graphical user interface where a Node 1 representative can select the desired entries from the certifying authority policy library. Alternative embodiments may utilize alternative approaches to provide these policies. In a third step 610, the certifying authority receives the entries (i.e. policies) for the N1 policy requirement. This can also be accomplished through a graphical user interface where a Node 1 representative can select the desired entries from the certifying authority policy library or through alternative methods such as an automated interface between N1 and the certifying authority node.

Subsequently in step 615, the certifying authority verifies the N1 policy commitment. This can include verifying that the N1 policy requirement will sufficiently maintain the N1 policy commitment. This can also include various steps of verifying the veracity of Node 1 such as by contacting third parties and by reviewing prior activity of Node 1. In step 620, it is determined whether the N1 policy is verified. If not, then processing ceases, otherwise processing continues to step 625.

In step 625, the header and body of the N1 certified policy are generated. The header includes the official name of Node 1 that was identified in step 600 above and a unique certified policy identifier (CPID). The CPID may be used by parties for identifying this policy in the future. The body includes the N1 policy commitments and may include the N1 policy requirements. Subsequently in steps 630 and 635, the header and body are hashed and the resulting hash is encrypted with the certifying authority private key. The encrypted hash is then added to the N1 certified policy as a digital signature in step 640, thereby completing the certified policy. The completed certified policy is then sent to N1 is step 645.

Figure 6B:
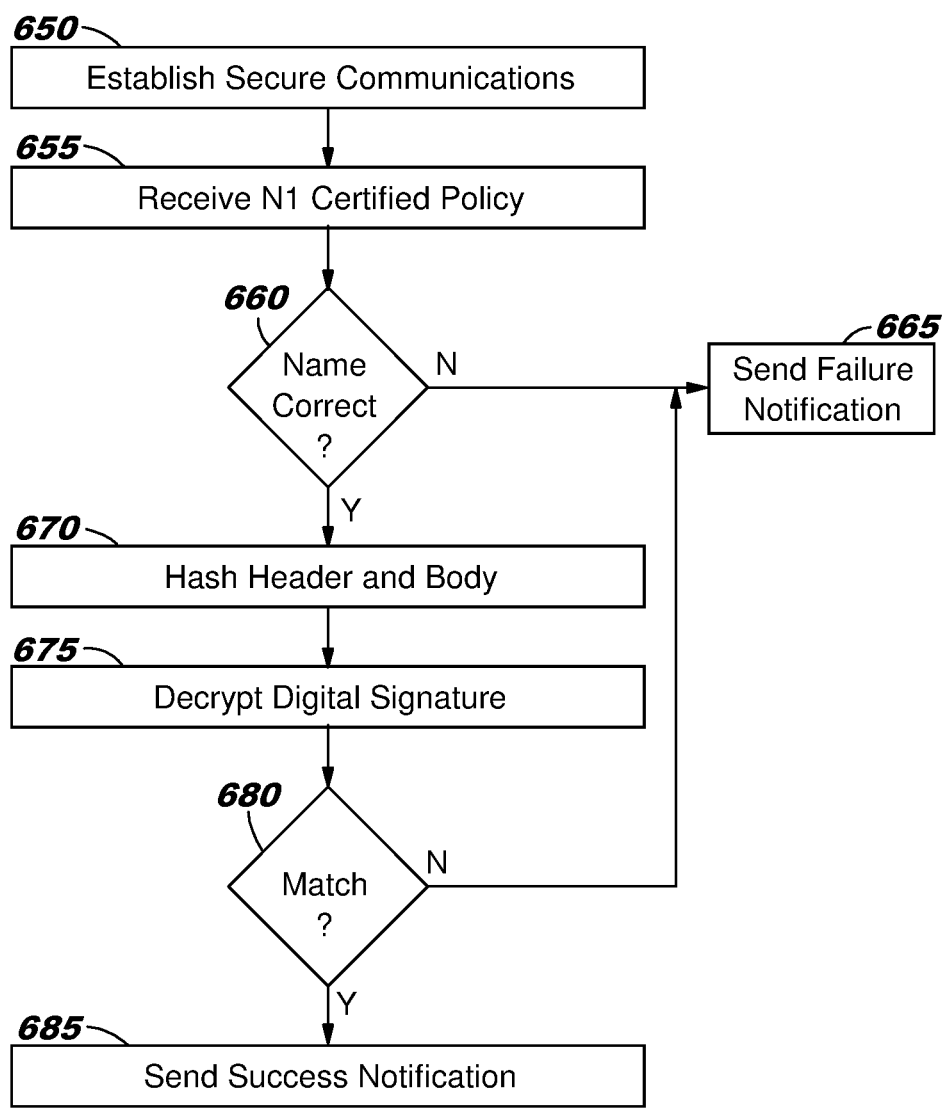

FIG. 6B is a flow diagram of an authentication of a certified policy in accordance with the first embodiment. This flow diagram is from the perspective of a Node 2 (N2) that has received a certified policy from Node 1 (N1), but could similarly be shown from the perspective of node 2 (N2) receiving a certified policy from N1 or other node. In a first step 650 secure communications are established between N2 and N1. This includes obtaining the official name of N1 through the exchange of certificates in establishing secure communications. In a second step 655, N2 receives the N1 certified policy as part of the process described above with reference to FIGS. 4A and 4B. Subsequently in step 660 N2 determines whether the name in the certified policy header matches the name obtained in step 650 above. If not, then a failure notification is sent on step 665 and processing ceases, otherwise processing continues to step 670. In step 670, N2 hashes the header and body of the N1 certified policy. N2 then decrypts the digital signature using the certifying authority public key in step 675. If N1 does not already have the certifying authority public key, it can be obtained directly from the certifying authority. Subsequently in step 680, it is determined whether the calculated hash matches the decrypted digital signature. If not, then a failure notification is sent on step 665 and processing ceases, otherwise a success notification is sent to N1 in step 685.

FIG. 7 is a block diagram of third party data stored in a node in which various embodiments may be implemented. This approach for storing data received from third parties under certified policies helps the node maintain the policies utilized when obtaining that data. The data from a single third party is illustrated in this example, although the data from many third parties may be similarly stored either separately or in a common database.

Data structure 700 includes a header 710 and body 720. Header 710 includes a data source 712, a data received 714, a policy commitment 716 and a policy requirement 718. Data source 712 may be the official name of the node or other entity that provided the data. Data source 712 may be obtained from the certificates utilized when establishing the secure communications for receiving the data. Date received 714 is the date in which the data was received. This may be useful for determining whether any time constraints such as a period of confidentiality has been reached, or for determining that the data may be stale and not as valuable or useful. Policy commitment 716 is the certified policy identifier (CPID) of the certified policy used by the node to obtain the information. This can be used to quickly determine the underlying commitments for the data. Policy requirement 718 is the certified policy identifier of the certified policy of the node or other entity that provided the data. This may be blank or null if the providing node did not include policy requirements in their certified policy.

Body 720 is shown with two sets of data that has been provided, although many other sets of data could have been provided. This includes a data type 722, data policy 724, and data 726. Data type 722 is the type of data provided. For example, the data may be social security numbers or addresses. Data policy 724 is the applicable data policy for that data type. For example, if the data type is a social security number and that information must be shared with third parties under confidence, the data policy number may be 0801 as illustrated in the example shown in FIG. 5B above. This data policy may be easily determined by reviewing the applicable certified policy referred to in the header, but having the information stored with the data is an added layer of protection. In addition the data policy number may be useful in indexing the data for use in quickly identifying data with certain restrictions. For example, if there are many sets of data stored in a large relational database, a user may be able to quickly determine in a query which data meets certain data types and policy requirements. Finally data 726 is included which is the data received from the third party. This may be a single data item or it may be millions of data items.

Figure 8B:
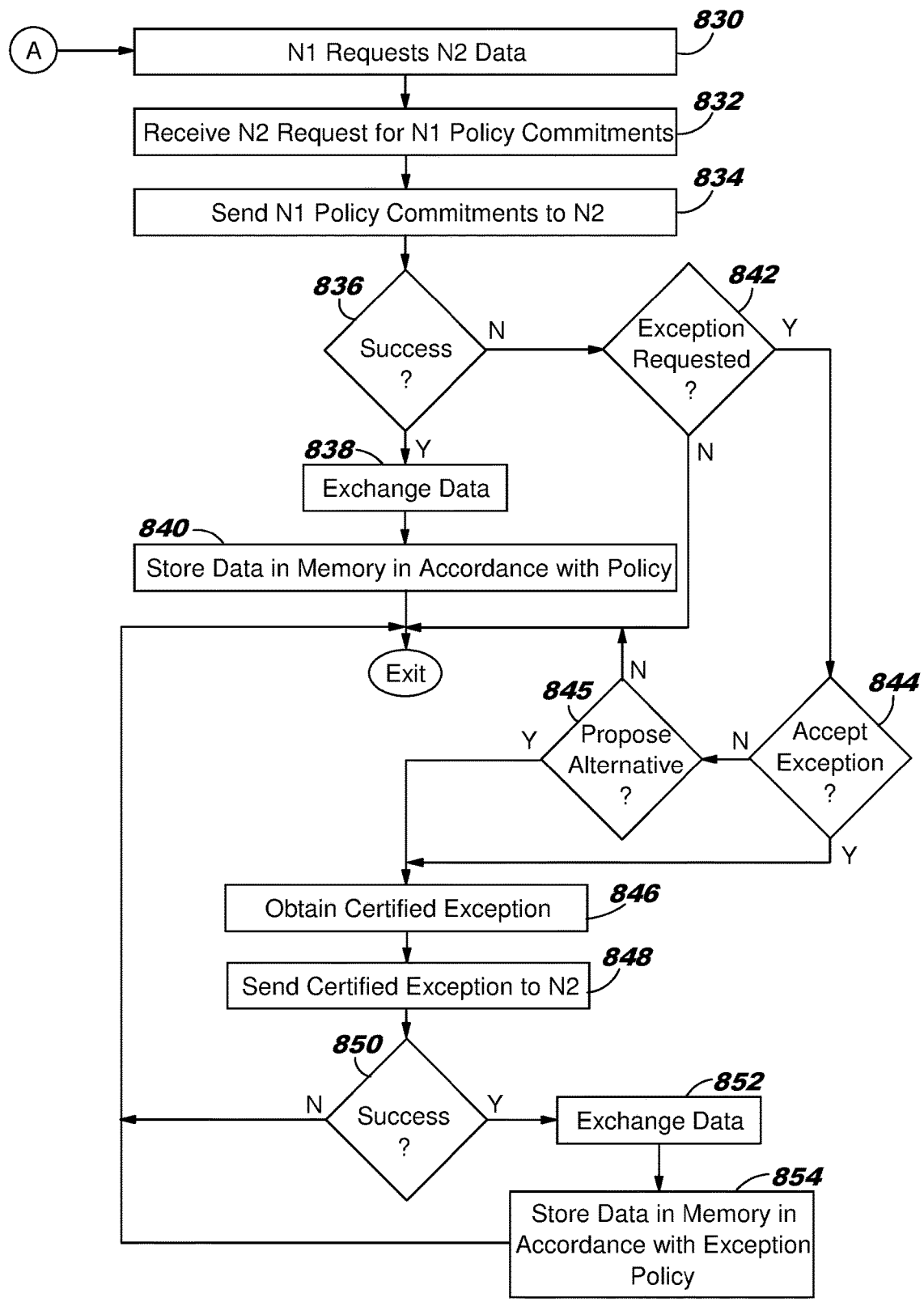

FIGS. 8A and 8B are a flow diagram of the operation of a node exchanging data handling policies and data with another node in accordance with a second embodiment. In this embodiment, the results of an exchange of policies allows for a subsequent negotiation for an exception to the standard policy. In this case, the flow diagram is shown from the perspective of node 1 (N1), but could similarly be shown from the perspective of node 2 (N2).

In a first step 800, node 1 establishes secure communications with node 2. In the case of an internet connection, this could involve the exchanging of certificates to establish the identity of the other node. This process should also yield the name of node 2 which will be utilized below. Those skilled in the art may utilize a variety of known techniques for establishing secure communications. In a second step 802, N1 determines whether it has received a request for N1 data from N2. If not, then processing continues to step 830 below. Otherwise, processing continues to step 804. In step 804, N1 determines whether the data requested needs protection or other data handling procedures. For example, the N1 data may contain sensitive information such as the social security number or employment identification number of N1, or information that may have been obtained by N1 from third parties. Alternatively, the N1 data requested may be non-sensitive information. Information about the sensitivity of data may be stored with that data in memory. If the requested data is not sensitive, then in step 806 N1 notifies N2 that the request for N1 data is approved and then processing continues to step 830 of FIG. 8B. Otherwise, processing continues to step 808.

In step 808, N1 requests a copy of the N2 policy commitments to determine whether N1 may share data with N2. These policy commitments may be incorporated into an N2 certified policy that has been signed by a certifying authority. In step 810, the policy commitments are received from N2. In an alternative embodiment, N2 may provide the N2 policy commitments when requesting the N1 data.

Subsequently in step 812, N1 authenticates (i.e. verifies) the N2 certified policy. As described above with reference to FIGS. 6A and 6B, a hash of the N2 certified policy has been encrypted with the private key of the certifying authority node thereby generating a certifying authority signature. N1 can then authenticate the certified policy by verifying that the certified policy is genuine and has not been modified. This authentication can be accomplished by hashing the certified policy, decrypting the signature using the certifying authority node public key, and comparing the results. In addition, N1 can compare the name of the node in the certified policy to the name or address acquired above when establishing the secure communications, thereby verifying node 2 is providing the correct certified policy and not the policy of a third party. Alternatively, N1 can challenge N2 to solve a problem with the private key associated with a public key contained in the certified policy. If the certified policy is authenticated, then processing continues to step 816, otherwise processing continues to step 814. In step 814, N1 notifies N2 of the failure and processing ceases. That is, if the certified policy cannot be verified as unmodified, then there is no reason to provide or exchange data with N2. This notification can include the reason for the failure.

In step 816, the N2 policy commitments are compared to the N1 policy requirements. This is to determine whether the N2 policy commitments meet or exceed the N1 policy requirements. If there are contradictions where the N2 policy commitments do not meet or exceed the N1 policy requirements, then N1 may not share data with N2 without an exception as the appropriate data handling protections are not in place at N2. This comparison may be accomplished mathematically. That is, the policy requirements and policy commitments may each include a set of references to the policy library. Each of the references in the N1 policy requirements must correspond to a reference in the N2 policy commitments. As a result, in step 816, it is determined whether the policies contradict each other. If yes, then processing continues to step 817. If not, then processing continues to step 806 where N1 notifies N2 that the request for N1 data is approved and then processing continues to step 830 of FIG. 8B. In step 817, it is determined whether the policy contradictions are acceptable. This step may be performed by a human, or it may be performed automatically based on predefined criteria. For example, certain contradictions may be acceptable depending on the contradiction, the sensitivity of the data requested, the relationship with N2, etc. If third party information is involved, N1 needs to verify that the terms of the policy commitment used to obtain that information are still met with the policy contradiction. If the contradiction is accepted, then processing continues to step 806, otherwise processing continues to step 818.

In step 818, N1 determines whether to request an exception. This determination may include human input, or it may be determined based on a set of criteria such as the importance of data that N1 may request from N2, the sensitivity of the data that N2 is requesting, any policy commitments made to obtain the data, prior positive data exchange experience with N2 such as prior exceptions allowed, etc. If no exception is requested, then processing returns to step 814 where N2 is notified of failure. Otherwise, processing continues to step 820. In step 820, N1 requests an exception from N2. In step 822, N1 receives a response from N2 regarding the requested exception. Then in step 824 it is determined whether the response is authenticated and acceptable to N1. If yes, then processing continues to step 806, otherwise processing continues to step 814 where N2 is notified of failure. Acceptability may be automated based on the policy library and a set of acceptable conditions, or it may involve human intervention.

In step 830 of FIG. 8B, N1 requests data from N2. As a result, in steps 832 through 854 N2 may initiate processes similar to steps 802 through 824 as a precursor for sharing N2 data with N1. In step 832 N1 will receive a request from N2 for the N1 policy commitment. This policy commitment may be a certified policy of N1. In response, N1 provides the policy commitment to N2 in step 834. N2 can then authenticate the N1 policy commitment and review that policy against the N2 policy requirements. In response, N2 will send a message to N1 whether the authentication and review was successful. N1 receives that message in step 836. If a notice of failure is received, then processing proceeds to step 842. If notice of success is received, then in step 838 N1 and N2 exchange data based on their requests. Subsequently, in step 840, N1 stores in memory the data received from N2 (and N2 stores in its memory the data received from N1). FIG. 7 above illustrates an example of storing such third party data in node memory.

In step 842, N1 determines whether N2 is requesting an exception to the N1 policy commitment. If not, then processing ceases, otherwise processing continues to step 844. In step 844, N1 determines whether to make such an exception. This determination may include human input, or it may be determined based on a set of criteria such as the importance of data that N1 may request from N2, the sensitivity of the data that N2 is requesting, prior positive data exchange experience with N2 such as prior exceptions requested, etc. If no, then processing continues to step 845, otherwise processing continues to step 846. In step 845, a determination is made whether to propose an alternative. This step may be performed by a human or automatically according to predefined criteria. Certain exceptions may be acceptable that are less in severity than the exception proposed by N2. For example, N1 policy commitment may be to share certain data confidently. N2 may request an exception to not share the data with third parties. The proposed alternative may be to share that data under confidence only after the source has been disguised. If an alternative is to be proposed, then processing continues to step 846, otherwise processing ceases.

In step 846, N1 obtains a certified exception to the standard policy commitment. N1 may already have a suite of certified policies that handle various exceptions. If not, then N1 may request a policy exception commitment certificate from a third party certification body. This process is explained in greater detail below with reference to FIG. 10A below. Once obtained, the certified exception is sent to N2 for review, authentication, and approval or not in step 848. In step 850, N1 determines whether the exception was approved by N2. If failure, then processing ceases. If success, then in step 852 N1 and N2 exchange data based on their requests. Alternatively, N2 may propose a different exception to continue the negotiations. Subsequently, in step 854, N1 stores in memory the data received from N2 (and N2 stores in its memory the data received from N1).

Figure 9:
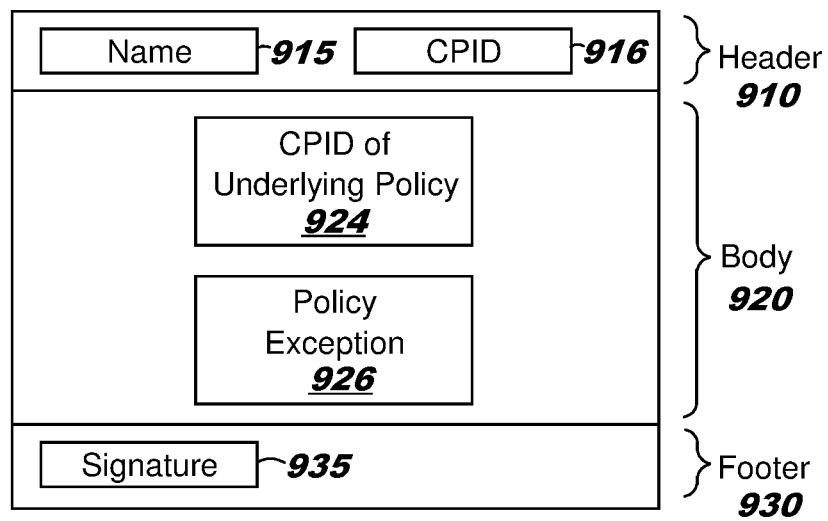
FIG. 9 is a block diagram of a certified policy exception in accordance with the second embodiment.

FIG. 9 is a block diagram of a certified policy with a policy exception in accordance with the second embodiment. A certified policy with an exception 900 is composed of three sections, a header 910, a body 920 and footer 930. The header can include a variety of information including an official name 915 of the node (entity or person) owning the certified policy and a certified policy identifier (CPID) 916. A separate set of identifiers for exceptions may be utilized in an alternative embodiment. The official name 915 is useful in authenticating the entity of the certified policy with the entity identified during the exchange of certificates in establishing secure communications as described below with reference to FIG. 10B. The certificate policy identifier 916 may be useful for storage with any data received or provided pursuant to the certified policy. The CPID may also be useful in quickly obtaining another copy of the certified policy if needed in the future.

The body can include a CPID of a prior policy commitment 924 which is being modified (excepted to) by the current policy exception 926. These are data handling policies that the node commits to apply to third party information obtained by the owner. In addition, the body can include a set of one or more a policy exception(s). These are exceptions to policy commitments. The policy commitments and policy exceptions may also be identified as described below with reference to FIG. 10B. The footer can also include a variety of information such as a digital signature 935. The digital signature may be generated by a certifying authority by hashing header 910 and body 920 and then encrypting that hash using the certifying authority private key. The certified policy can then be authenticated by similarly hashing the header and body of the certified policy, decrypting digital signature 935 using the certifying body public token, and comparing the results. If the certified policy header and footer have not been modified, then the hash results should match the decrypted digital signature, thereby authenticating the certified policy. In addition, name 915 should match the name of the node providing the certified policy.

Data from a third party received under a policy exception can be stored in a node as shown in FIG. 7 above. Instead of storing the data with the CPID of the polity commitment, the data may be stored with the CPID of the policy exception. The CPID of the policy exception may be used to obtain the underlying policy commitment and the exception to that commitment.

Figure 10A:
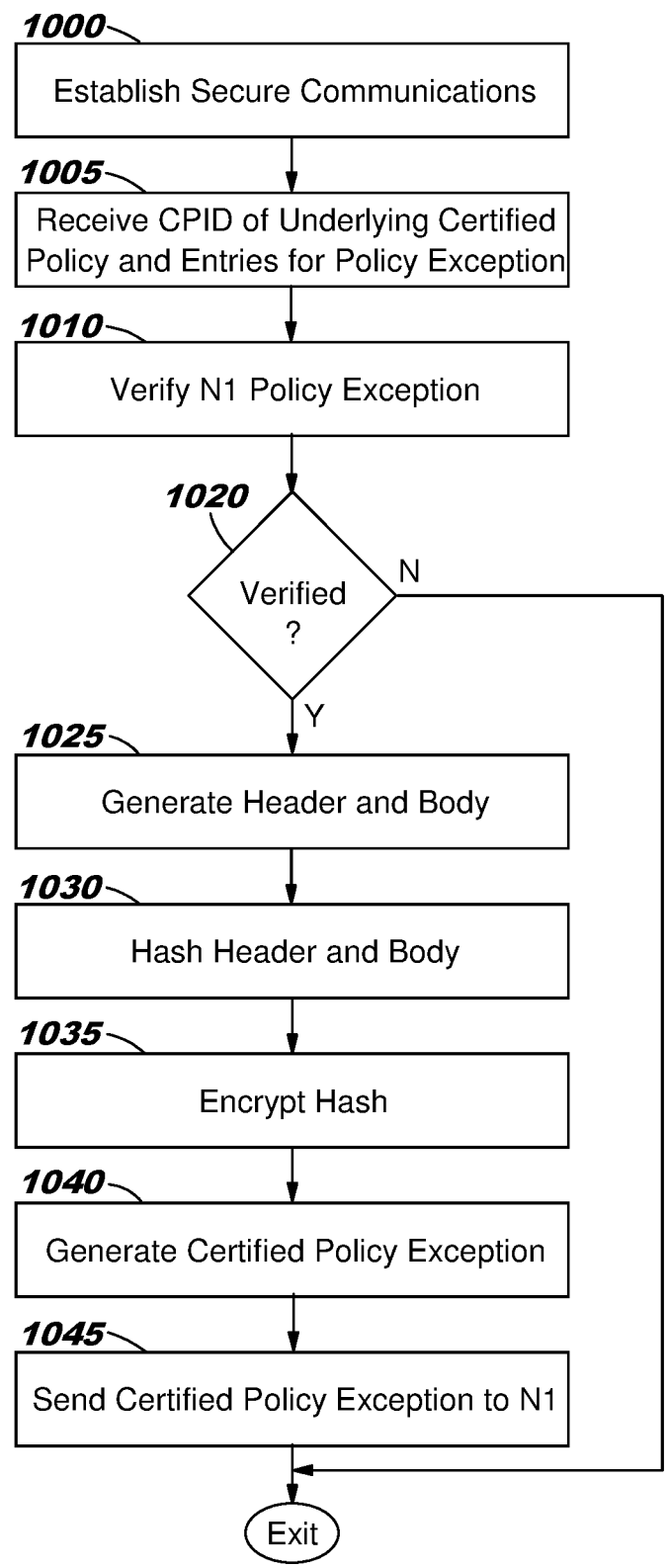
FIGS. 10A and 10B are flow diagrams of a creation and an authentication of a certified policy exception in accordance with the second embodiment.

FIG. 10A is a flow diagram of a creation of a certified policy exception in accordance with the second embodiment. This flow diagram is from the perspective of the certifying authority that is contacted by Node 1 (N1) to generate a certified policy with a certified exception but could similarly be shown from the perspective of node 2 (N2). In a first step 1000, secure communications are established between the certifying authority node and N1. This includes obtaining the official name of Node 1 through the exchange of certificates in establishing secure communications. In a second step 1005, the certifying authority receives the CPID of the underlying certified policy and the entry(ies) (i.e. policies) for the N1 policy exception. This can be accomplished through a graphical user interface where a Node 1 representative can select or preselect the desired entries from the certifying authority policy library or through alternative methods such as an automated interface between N1 and the certifying authority node.

Subsequently in step 1010, the certifying authority verifies the N1 policy exception. This can include verifying the veracity of Node 1 such as by contacting third parties and by reviewing prior activity of Node 1. Given that this is a policy exception based on a prior verified N1 policy commitment, this step may be easily automated and then periodically verified through an audit procedure. In step 1020, it is determined whether the N1 policy is verified. If not, then processing ceases, otherwise processing continues to step 1025.

In step 1025, the header and body of the N1 certified policy are generated. The header includes the official name of Node 1 that was identified in step 1000 above and a unique certified policy identifier (CPID). The CPID may be used by parties for identifying this policy exception in the future. The body includes the CPID of the underlying N1 policy commitments and the library entry of the policy exception. Subsequently in steps 1030 and 1035, the header and body are hashed and the resulting hash is encrypted with the certifying authority private key. The encrypted hash is then added to the N1 certified policy exception as a digital signature in step 1040, thereby completing the certified policy exception. The completed certified policy exception is then sent to N1 is step 1045.

Figure 10B:
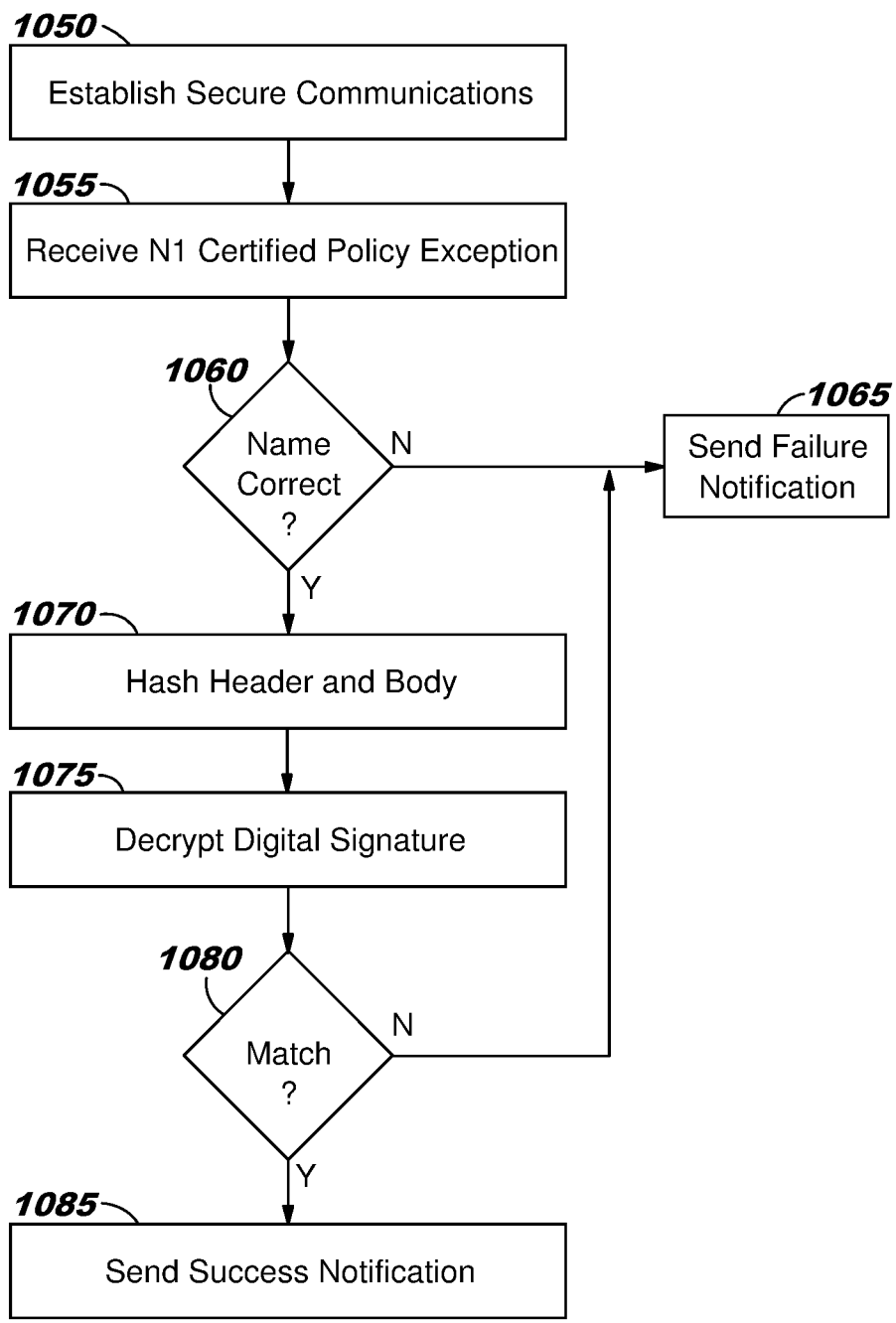

FIG. 10B is a flow diagram of an authentication of a certified policy exception in accordance with the second embodiment. This flow diagram is from the perspective of a Node 2 (N2) that has received a certified policy exception from Node 1 (N1), but could similarly be shown from the perspective of node 2 (N2) receiving a certified policy exception from N1 or other node. In a first step 1050 secure communications are established between N2 and N1. This includes obtaining the official name of N1 through the exchange of certificates in establishing secure communications. In a second step 1055, N2 receives the N1 certified policy exception as part of the process described above with reference to FIGS. 8A and 8B. Subsequently in step 1060 N2 determines whether the name in the certified policy header matches the name obtained in step 1050 above. If not, then a failure notification is sent on step 1065 and processing ceases, otherwise processing continues to step 1070. In step 1070, N2 hashes the header and body of the N1 certified policy exception. N2 then decrypts the digital signature using the certifying authority public key in step 1075. If N1 does not already have the certifying authority public key, it can be obtained directly from the certifying authority. Subsequently in step 1080, it is determined whether the calculated hash matches the decrypted digital signature. If not, then a failure notification is sent on step 1065 and processing ceases, otherwise a success notification is sent to N1 in step 1085.

The invention can take the form of an entirely software embodiment, or an embodiment containing both hardware and software elements. In a preferred embodiment, the invention is implemented in software or program code, which includes but is not limited to firmware, resident software, and microcode.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), or Flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code such as for managing data handling policies between multiple data processing systems. A client data processing system may download that computer usable code, such as for storing on a data storage medium associated with the client data processing system, or for using in the client data processing system. The server data processing system may similarly upload computer usable code from the client data processing system such as a content source. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

The terminology used herein is for the purpose of describing particular embodiments and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of automatically obtaining sensitive data in accordance with a set of predetermined policy commitments including data handling policies a node commits to for handling and protecting sensitive data, the method comprising:

establishing a secure connection between a first node and a second node across a network;

providing a request from the first node to obtain a set of sensitive data from the second node;

providing a set of certified policy commitments from the first node, wherein the set of certified policy commitments includes data handling policies that the first node commits to utilize in handling and protecting the set of sensitive data of the second node, and wherein the set of policy commitments are provided to the second node for authentication and for comparison of the data handling policies of the first node to data handling policies of a set of predetermined policy requirements the second node requires for handling and protecting the requested sensitive data prior to the second node providing access to the first node of the requested set of sensitive data; and as an indication of positive authentication of the set of policy commitments and an indication that the data handling policies of the set of policy commitments of the first node at least meet the data handling policies of the set of predetermined policy requirements of the second node, receiving access to the requested set of sensitive data from the second node.

2. The method of claim 1 wherein the certified policy commitments are provided for authentication by utilizing a public key of a certifying authority.

3. The method of claim 1 wherein the set of policy commitments is selected from a standard set of policy commitments.

4. The method of claim 3 wherein the standard set of policy commitments include data handling policies that are hierarchically consistent.

5. The method of claim 1 further comprising receiving a denial from the second node, providing a request to the second node for an exception to the data handling policies of the set of predetermined policy requirements the second node requires for handling and protecting the requested sensitive data.

6. The method of claim 5 further comprising receiving an exception to the set of certified policy commitments from the node across the network.

7. The method of claim 1 further comprising the first node managing the received set of sensitive data in accordance with the certified policy commitments provided to the second node.

8. A computer usable program product comprising a non-transitory computer usable storage medium including computer usable code for use in automatically obtaining sensitive data in accordance with a set of predetermined policy commitments including data handling policies a node commits to for handling and protecting sensitive data, the computer usable program product comprising code for performing the steps of:

establishing a secure connection between a first node and a second node across a network;

providing a request from the first node to obtain a set of sensitive data from the second node;

providing a set of certified policy commitments from the first node, wherein the set of certified policy commitments includes data handling policies that the first node commits to utilize in handling and protecting the set of sensitive data of the second node, and wherein the set of policy commitments are provided to the second node for authentication and for comparison of the data handling policies of the first node to data handling policies of a set of predetermined policy requirements the second node requires for handling and protecting the requested sensitive data prior to the second node providing access to the first node of the requested set of sensitive data; and as an indication of positive authentication of the set of policy commitments and an indication that the data handling policies of the set of policy commitments of the first node at least meet the data handling policies of the set of predetermined policy requirements of the second node, receiving the requested set of sensitive data from the second node.

9. The computer usable program product of claim 8 wherein the certified policy commitments are provided for authentication by utilizing a public key of a certifying authority.

10. The computer usable program product of claim 8 wherein the set of policy commitments is selected from a standard set of policy commitments.

11. The computer usable program product of claim 10 wherein the standard set of policy commitments include data handling policies that are hierarchically consistent.

12. The computer usable program product of claim 8 further comprising receiving a denial from the second node, providing a request to the second node for an exception to the data handling policies of the set of predetermined policy requirements the second node requires for handling and protecting the requested sensitive data.

13. The computer usable program product of claim 12 further comprising receiving an exception to the set of certified policy commitments from the node across the network.

14. The computer usable program product of claim 8 further comprising the first node managing the received set of sensitive data in accordance with the certified policy commitments provided to the second node.

15. A data processing system for automatically obtaining sensitive data in accordance with a set of predetermined policy commitments including data handling policies a node commits to for handling and protecting sensitive data, the data processing system comprising:

a processor; and a memory storing program instructions which when executed by the processor execute the steps of:

establishing a secure connection between a first node and a second node across a network;

providing a request from the first node to obtain a set of sensitive data from the second node;

providing a set of certified policy commitments from the first node, wherein the set of certified policy commitments includes data handling policies that the first node commits to utilize in handling and protecting the set of sensitive data of the second node, and wherein the set of policy commitments are provided to the second node for authentication and for comparison of the data handling policies of the first node to data handling policies of a set of predetermined policy requirements the second node requires for handling and protecting the requested sensitive data prior to the second node providing access to the first node of the requested set of sensitive data; and as an indication of positive authentication of the set of policy commitments and an indication that the data handling policies of the set of policy commitments of the first node at least meet the data handling policies of the set of predetermined policy requirements of the second node, receiving the requested set of sensitive data from the second node.

16. The data processing system of claim 15 wherein the certified policy commitments are provided for authentication by utilizing a public key of a certifying authority.

17. The data processing system of claim 15 wherein the set of policy commitments is selected from a standard set of policy commitments.

18. The data processing system of claim 17 wherein the standard set of policy commitments include data handling policies that are hierarchically consistent.

19. The data processing system of claim 15 further comprising receiving a denial from the second node, providing a request to the second node for an exception to the data handling policies of the set of predetermined policy requirements the second node requires for handling and protecting the requested sensitive data.

20. The data processing system of claim 15 further comprising the first node managing the received set of sensitive data in accordance with the certified policy commitments provided to the second node.

* * * * *